(No Model.)

C. R. TURNER.
SINK CLEANER.

No. 285,771. Patented Sept. 25, 1883.

WITNESSES:
John K. Deemer
C. Sedgwick

INVENTOR:
C. R. Turner
BY Munn & Co
ATTORNEYS.

UNITED STATES PATENT OFFICE.

CALEB R. TURNER, OF BROOKLYN, NEW YORK.

SINK-CLEANER.

SPECIFICATION forming part of Letters Patent No. 285,771, dated September 25, 1883.

Application filed July 3, 1883. (No model.)

*To all whom it may concern:*

Be it known that I, CALEB R. TURNER, of Brooklyn, in the county of Kings and State of New York, have invented a new and Improved Sink-Cleaner, of which the following is a full, clear, and exact description.

My invention consists of a novel sink-cleaner comprising a suitable brush or scraper for collecting the refuse in the sink and a scoop or shovel for taking up the refuse.

Reference is to be had to the accompanying drawings, forming part of this specification, in which similar letters of reference indicate corresponding parts in all the figures.

Figure 1:
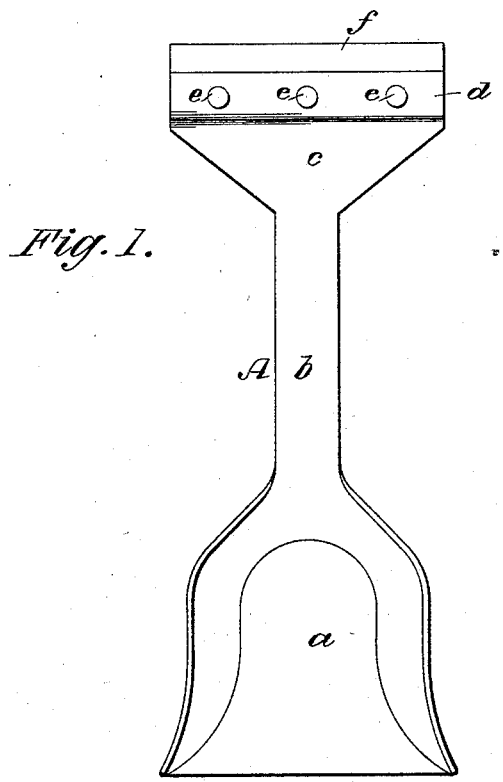
Figure 2:
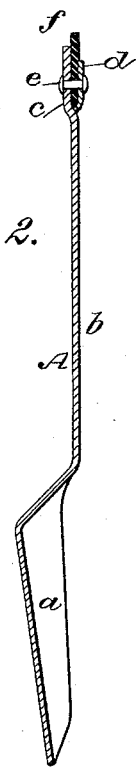
Figure 3:
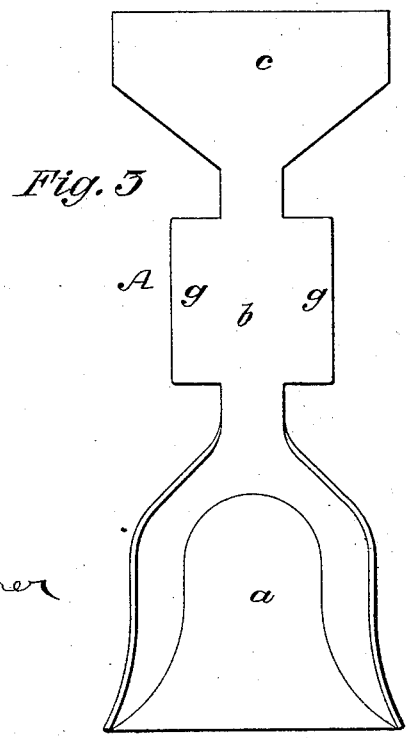

Figure 1 is a plan view of my novel sink-cleaner. Fig. 2 is a sectional elevation of the same; and Fig. 3 is a plan view, showing a modification.

When made in the most approved form, the sink-cleaner A will be formed with the shovel or scoop portion $a$, handle portion $b$, and scraper or brush portion $c$, all, by preference, stamped in one piece out of sheet metal. To the rear edge of the brush or scraper portion $c$ is secured, by means of the plate $d$ and rivets $e\ e$, the brush or scraper $f$, which may be composed of a strip of rubber, or of bristles, or of any other suitable material.

In some cases, instead of making the handle portion $b$ plain and flat, as shown in Figs. 1 and 2, I shall stamp the blank for the cleaner so as to form the side wings, $g\ g$, which may be subsequently rolled under to make a round handle, as will be understood from Fig. 3.

In use, the brush or scraper $f$ will be used for collecting such refuse on the bottom of the sink as will not pass out of the waste-pipe, and then the shovel portion $a$ will be used for taking up the refuse and lifting it out of the sink, the single implement serving both purposes.

I do not abandon or dedicate to the public any patentable feature set forth herein and not hereinafter claimed, but reserve the right to claim the same either in a reissue of any patent that may be granted upon this application or in other applications for Letters Patent that I may make.

Having thus described my invention, what I claim as new, and desire to secure by Letters Patent, is—

1. As a new article of manufacture, a sink-cleaner composed of a shovel or scoop portion, a handle portion, and a brush or scraper, substantially as described.

2. The combination, with the shovel or scoop portion $a$, handle portion $b$, and scraper or brush portion $c$, of the scraper or brush $f$, held upon the portion $c$ by the plate $d$ and rivets $e$, substantially as described.

CALEB R. TURNER.

Witnesses:
H. A. WEST,
C. SEDGWICK.